Patented Nov. 2, 1937

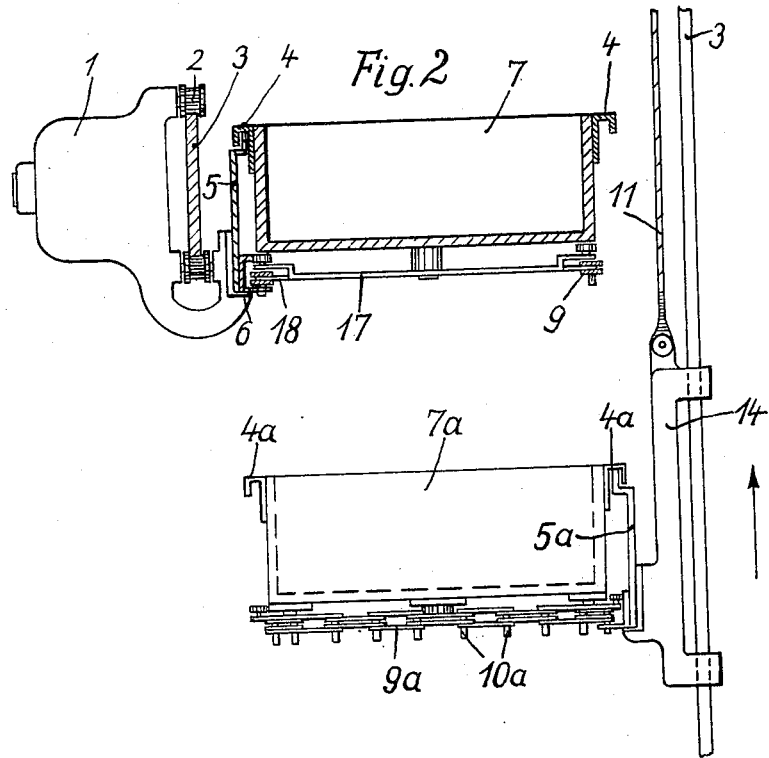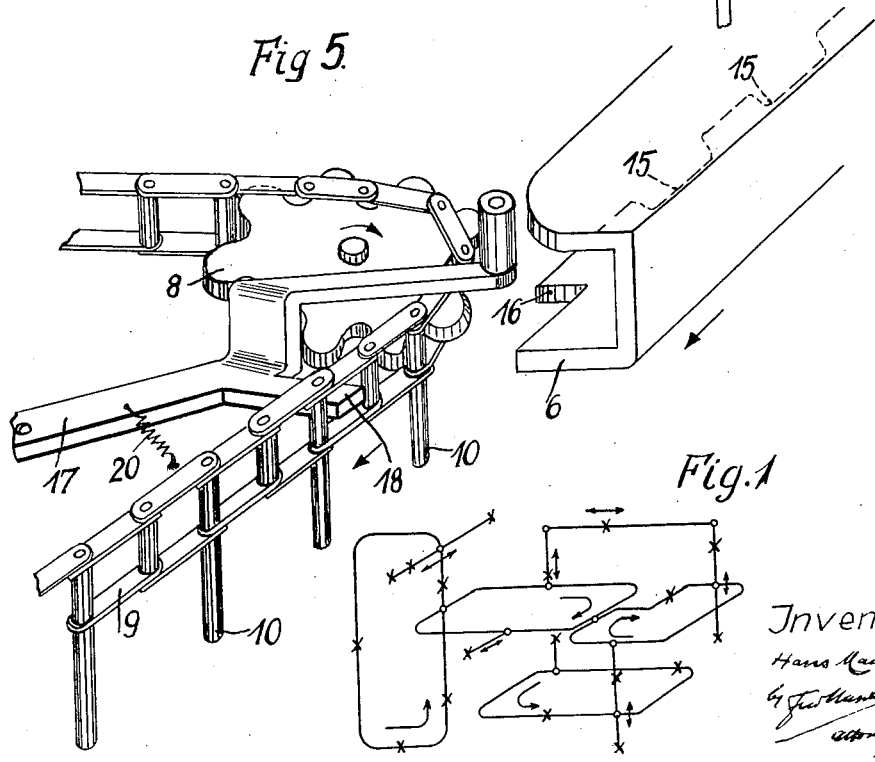

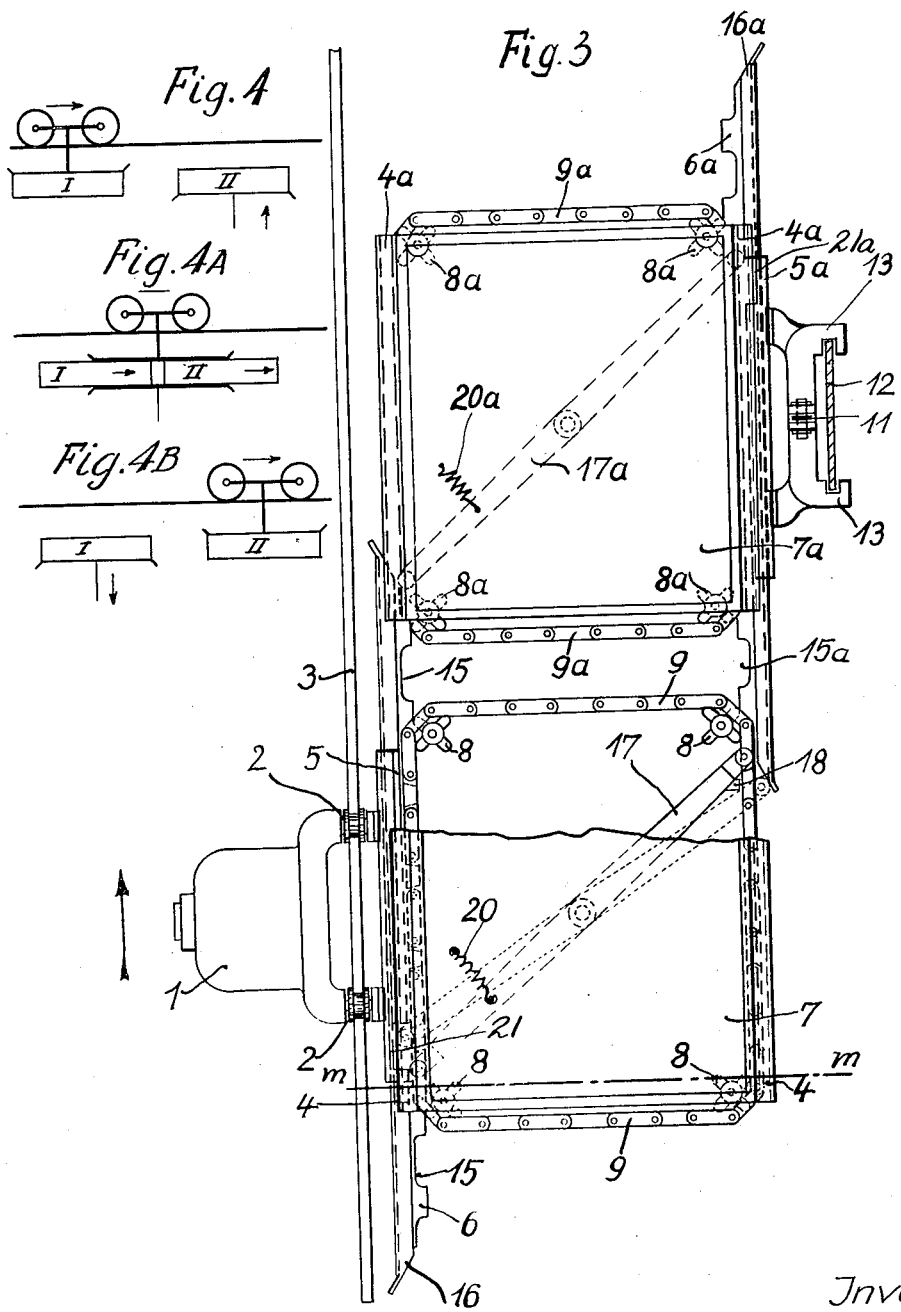

2,098,154

UNITED STATES PATENT OFFICE 2,098,154

TRANSFER DEVICE

Hans Mauch, Berlin-Charlottenburg, Germany, assignor to Telephon-Apparat-Fabrik E. Zwietusch & Co., G. m. b. H., Berlin, Germany Application October 13, 1933, Serial No. 693,432
In Germany October 17, 1932

5 Claims. (Cl. 104—48)

This invention relates to an automatic transfer system for containers conveyed along two tracks and designed to transfer the container from one track to the other. The containers are held each by a holding device of a conveying element adapted to run on a track, said holding device being constructed so that, when encountering a container moved on another track, it actuates a circulating means on this container whereby the container is detached from its conveying element and engages the conveying element on the other track.

According to the invention containers which are detachable from the conveying elements are used and they are equipped with a driving means and provided with U-bars on two opposite sides. The conveying elements are each equipped with a holding device adapted to engage under the U-bar of the containers on one side by engaging in one of the two U-bars. The driving means on the containers is so constructed that it can engage with an abutment on the receiving conveying element to which it is to be transferred. By the engagement of the conveying elements to receive the container with the driving mechanism of this container, the container will be shifted in the same direction as and at half the speed of the receiving conveying element, so that the holding device of this conveying element can slide into the U-bar of the container. At the same time the container is moved out of the holding device of the conveying element delivering the container.

An embodiment of the invention is illustrated by way of example in the accompanying drawings in which:—

Fig. 1 is a diagrammatic view showing a conveyor system with different kinds of converging tracks.

Fig. 2 shows in side elevation a conveying element with a container running on a horizontal track and a conveying element with a container running on a vertical track.

Fig. 3 is a top plan view of the arrangement shown in Fig. 2.

Figs. 4, 4A and 4B show diagrammatically the positions of two containers before, during and after their transfer between two different conveying elements.

Fig. 5 is a perspective view showing a part of the driving mechanism on the container and a part of the holding device of the conveying element receiving the container.

In Fig. 1 several tracks are shown diagrammatically the points at which the transfer of a container from one path to another is effected, being designated by a circle, and the dispatch and receiving stations being designated by a cross. The arrow indicates the travelling direction on the conveying elements.

As can be seen from Fig. 1, there are endless tracks on which the conveying elements always run in the same direction and tracks on which the conveying elements can travel in both directions. The endless tracks may be either horizontal, for example like the endless paths of an electric post or rope post system or they may be vertical for example like circulating elevators. The lineal paths extend either horizontally, and are then termed reciprocating paths or in vertical direction as elevators. The drive of the conveying elements may be stationary as, for example, in postal ropeways or elevators in which the drive of the conveying elements is effected by a pull rope, or movable as in an electric postal system in which the driving motor is fixed on the conveying element.

Figs. 2 and 3 show an electric postal conveying element with container suspended therein and an elevator with container suspended therein. The containers which serve for accommodating the goods to be transported are all of uniform construction so that they can be transported by the electric postal track and also by the elevator. These containers, which in Figs. 2 and 3 are designated by 7 and 7a, are wooden boxes in the example illustrated. In Fig. 2 the container 7 is shown in section and the container 7a in elevation. Two U-shaped bars 4 are fixed on the outer sides of two opposite side walls of the container 7. Sprocket wheels 8 are rotatably mounted one at each of the four corners on the bottom of the container. A link chain 9 extends over these four wheels. The bolts of the chain are lengthened at the lower end as shown in Fig. 2, the bolts 10a belonging to the chain 9a of the container 7a. The chain 9 of the container 7 is shown in section and consequently only one bolt 10 is visible. These bolts can engage in corresponding recesses in the holding device of the conveying element hereinafter described. A lever 17 is pivotally mounted on the lower surface of the bottom of each container in the middle thereof. The free ends of this lever 17 are designed to engage in the chain to prevent it from circulating. The lever 17 is held by a spring 20 (Fig. 3) in such a position that it engages in the chain. This is shown in perspective in Fig. 5, wherein the end of the lever 17 is bifurcated. One arm 18 of the bifurcated end engages in the chain, whereas the other is bent and projects slightly beyond the chain. This bent end is designed to engage the end of the holding device of the conveying element designed to receive the container so that the lever 17 is swung during this procedure and the chain 9 unlocked.

The conveying element which is to run on a circular path has an electric motor diagrammatically illustrated and designated by 1 in Figs. 2 and 3. This motor drives the roller 2 in known manner and thus propels the conveying element along the track 3. The conveying element proper comprises two rigidly interconnected bars 5 and 6 fixed on the supporting frame of the motor and serving as carrier and guide for the container 7. The bar 5 is made of thick sheet metal of about the same length as the U-bars 4 on the container. The bar 6 is a U-section iron the lower arm of which is similar to a rack as it has recesses 15 in which the bolts 10 of the chain 9 enter (Fig. 5). The upper arm of the U-section bar 6 is designed to act upon the bifurcated end of the lever 17 of the encountered container. The sprocket wheel 8 and chain 9 partly project into the gap between the two arms of the U-section bar 6.

The conveying elements for the container 7a on the elevator are constructed absolutely similarly to the conveying elements on the horizontal track. They comprise the U-section bar 6a and the carrying bar 5a which are fixed on the elevator cage 14. This cage 14 is moved by a pull rope 11 upwards and downwards along the rails 12 which are embraced by guide cheeks 13.

If a container 7a is to be transferred from the elevator cage 14 onto a conveying element on a horizontal track and the container 7 from the track on to the elevator, the cage is brought into a position in which the container 7a is in the same plane as the container 7. The elevator remains in this position until the transferring operation has been completed. The control of the elevator in dependency upon the approach of an electric postal conveying element carrying a container intended for a station served by the elevator can be carried out electrically in any known manner.

The exchanging of the two containers 7 and 7a takes place in the following manner:—

At the approach of a conveying element on the electric postal track, which container is to move along a horizontal circular path (Fig. 1), to a point of intersection between this horizontal track and the track of an elevator, which point is illustrated diagrammatically by a small circle in Fig. 1, the elevator is set in operation by some known electrical means which are not described and the cage moves into the same plane as that in which the conveying element is running. On reaching this position the elevator is stopped in some known manner for example by means of an abutment. The position of the elevator relatively to the conveying element running on the circular track is chosen so that the elevator conveying element holds its container 7 or 7a on a different side to the electric postal track. The transferring of the two containers 7 and 7a is effected by the movement of the electrically operated conveying element. As this conveying element approaches the elevator cage, first the upper arm of the bar 6a on the corresponding conveying element contacts with the bent end of the lever 17 on the container 7 and causes this lever 17 to swing against the action of the spring 20. Thus, the arm 18 of the lever 17 is swung out of engagement with the chain 9 so that the chain 9 can circulate (Fig. 5). As the conveying element continues its movement one of the bolts 10 of the chain 9 engages the lower arm of the rail 6a. Consequently the chain 9 will be circulated during the continued movement of the conveying element. This circulation causes the container 7 to shift on the bar 5 of the holding device because the bolts 10 of the chain 9 engage in the recesses 15a of the bar 6a and by the circulation of the chain 9 the chain with the container 7 moves out of its holding device. The speed of motion of the container 7 relatively to the stationary elevator cage 14 is half as great as the speed of the conveying element relatively to the elevator cage. Owing to the movement of the container at half the speed of its conveying element the U-bar 4 slides on to the guide bar 5a, whereas, owing to the greater speed of the conveying element as compared with the container 7 the carrying bar 5 slides out of the other U-bar 4. During the circulation of the chain 9 the bolts 10 engage in the recesses 15a in the bar 6a of the elevator holding device 14. Simultaneously with the engagement of the lever 17 of the container 7 with the bar 6a of the encountered conveying element the lever 17a of the container 7a comes into engagement with the U-section bar 6 of the postal conveying element so that the chain 9a is unlocked. The U-section bar 6 likewise engages a bolt 10a of the chain 9a and causes this chain 9a to circulate. The result is that the container 7a is shifted by the bar 6 in the same direction as and at half the speed of the conveying element. The bent end of lever 17 slides along the upper arm of bar 6a, whereas the bent end of lever 17a slides along the upper arm of bar 6. As soon as the conveying element has travelled past the elevator cage, the levers 17 and 17a enter the recesses 21 and 21a in the bars 5 and 5a respectively under the action of their springs 20 and 20a and are returned into their initial positions, in which they lock the chains 9 and 9a respectively. The individual movements which take place are again illustrated in Figs. 4, 4A and 4B.

Fig. 4 shows the position of the containers shortly before the transfer. The elevator has already brought the container II into the circular path of the electric postal conveying element and come to a standstill. The containers I and II are gripped on one end by the holding bars of the conveying element. Fig. 4B shows how the transfer and exchange of the two containers I and II takes place. As already described with reference to Figs. 3, 4, 4A and 4B, by the engagement of the bar on the elevator conveying element with the driving mechanism of the container I, the container I will only move in the direction of the arrow at half the speed of the conveying element on its track. By the engagement of the conveying element with the driving mechanism of the container II the container II is likewise moved in the direction of the arrow out of the holding device of its conveying element, which in this instance is the stationary elevator platform or cage and at half the speed of the conveying element which is likewise moving in the direction of the arrow. Fig. 4B shows the position of the containers after the transfer. The container I is now on the elevator which can convey the container to its destination, whereas the container II is gripped by the U-bar of the other conveying element and can likewise be conveyed to its destination.

I claim:—

1. A transfer system for conveyor plants comprising in combination, several tracks, each having a point of transfer in common with one of the other tracks, conveying elements running on said tracks, a container holding device on each of said conveying elements, a circulating chain surrounding each container at the bottom thereof and having parallel runs, a bar on each conveying element adapted at the point of transfer between two containers to engage and drive the circulating chain on the container carried by another conveying element, a lock element on each container adapted to engage opposite runs of the circulating chain when no transfer is being made, and means on each conveying element adapted to disengage the lock element when transfer is about to be made on the container of another conveying element.

2. A transfer system as specified in claim 1 in which the conveying element is provided with a container supporting device consisting of a carrying bar fixed on the inner side of the conveying element, said driving bar being of U-shape in cross section and fixed on the lower end of said carrying bar and adapted to engage with the opposite runs of the circulating chain on the corresponding container and to serve as an abutment for the corresponding side of the container, and a U-shape bar on the upper end of each of the side walls of the container above the carrying bar, one of said last named U-bars adapted to grip over the free end of said carrying bar.

3. A transfer system as specified in claim 1, comprising in combination with the circulating chain on a container and the locking element for said circulating chain, the holding device consisting of a carrying bar fixed at one end on the corresponding conveying element and adapted to carry a container and of the driving bar for the circulating chain, said driving bar being of U-shape in cross section and fixed on the fixed end of said carrying bar and adapted to serve as an abutment for the corresponding side of said container, said U-section bar being longer than the corresponding side of the container, the free end of said U-section bar being bevelled and adapted to act upon said locking means of another container, and U-bars one on the upper end of the outer side of each of two opposite side walls of said container, one of said last mentioned U-bars adapted to grip over the free end of said carrying bar.

4. A transfer system as specified in claim 1, comprising in combination with the container holding device, said driving bar for the circluating chain comprising a rack portion, the circulating chain on the container passing over rollers on the bottom of said container, the pintles of the chain links extended at their lower ends and projecting from said chain and adapted to be acted upon by the rack portion of the driving bar of another conveying element.

5. A transfer system as specified in claim 1, comprising in combination with the container holding device on the conveying element and the circulating chain on the container, the locking element on the container consisting of a lever oscillatably mounted on the lower surface of the bottom of the container, the disengaging means and the driving bar for the circulating chain united to form a U-section bar adapted to oscillate the oscillatable lever of another conveying element and to drive the circulating chain of said other conveying element.

HANS MAUCH.